Inventor:
Charles D. Linnenbank
by his Attorneys
Howson & Howson

United States Patent Office 2,714,798
Patented Aug. 9, 1955

2,714,798

METHOD FOR MANUFACTURING CHAIN

Charles D. Linnenbank, Chester, Pa., assignor to Baldt Anchor, Chain and Forge Division of the Boston Metals Company, Chester, Pa., a corporation of Maryland Application January 28, 1953, Serial No. 333,677

7 Claims. (Cl. 59—35)

The present invention relates to new and useful improvements in the manufacture of chain and more particularly to new and useful improvements in the manufacture of welded chain of the type having an integral stud or cross member on each link to prevent the chain from tangling or fouling and for resisting the tendency of the minor axis of each link to contract under tension.

Prior to the present invention chain of this type was commonly manufactured by first forming a link in one integral piece and then cutting completely through a side or end wall of the link. The cut portion of the link was bent upwardly or outwardly to permit the insertion of an adjacent link and then the displaced portion of the link was bent back to substantially its original position and the link was welded. In this prior method of manufacturing chain, the link itself was distorted and weakened by the bending operation thus decreasing the quality and strength of the chain. This distortion of the chain is due to the fact that even though the initial link is made to the exact desired shape, after a portion of the link is once bent or displaced upwardly or outwardly, it can never be returned to its original shape solely by a bending operation and thus the link made by this prior process will not properly fit chain handling mechanisms. The weakening of the link is particularly noticeable when the original link has been forged since a forging operation sets up a particular crystalline structure in the link which gives it greater strength, whereas if the link is bent after forging, this crystalline structure is altered thereby greatly decreasing the strength of an individual link.

According to the present invention a link having a stud or cross member is formed, for example, by forging, and the link is cut either during or after the forming operation so that a portion of one side of the link is carried solely by the stud. The stud and this portion of the link are displaced upwardly from the link to form an entrance to the link and permit the insertion of the adjacent links. The cut portion of the link is then forced back to its original position and welded to the link body thereby forming a chain wherein the load carrying portions of the links are not, in any manner, weakened during manufacture of the chain.

With the foregoing in mind, the principal object of the present invention is to provide a novel method of manufacturing chain wherein each link has exactly the same shape and strength after the chain is assembled as it had prior to the assembling operation.

Another object of the present invention is to provide a novel method of manufacturing chain wherein the body portion of the link is not bent or distorted to permit adjacent links to be inserted therein.

Another object of the present invention is to provide a novel method of manufacturing chain having the features and characteristics set forth which is relatively simplified and entirely efficient and effective in operation and use.

These and other objects of the present invention and the various features and details of the operation and use thereof are hereinafter more fully set forth and described with reference to the accompanying drawings in which.

Figure 1:
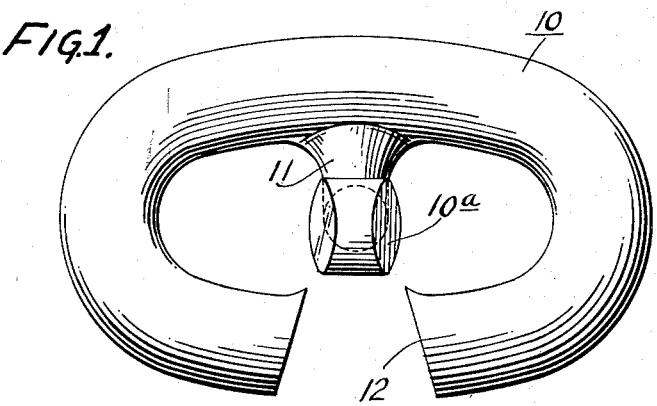
Fig. 1 is a plan view of a chain link made in accordance with the present invention which is prepared for the insertion of adjacent links.
Figure 2:
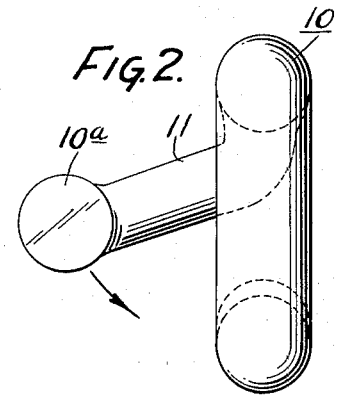
Fig. 2 is an end elevational view of the link illustrated in Fig. 1.
Figure 3:
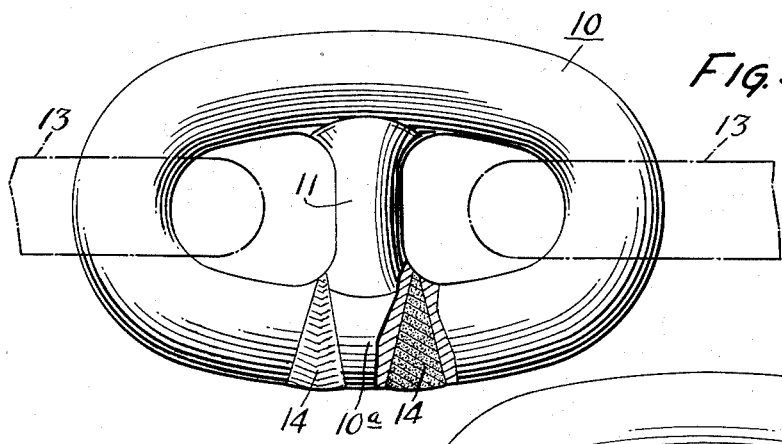
Fig. 3 is a plan view of a portion of a chain made according to the method of the present invention.

With reference to the embodiment of the invention illustrated in Figs. 1 to 3, inclusive, of the drawings, a chain link made in accordance with the present invention is designated generally as 10 and has a stud or cross member 11 formed integrally therewith and extending between the central portions of the opposite sides of the link. The link 10 may be manufactured by casting, pressing, forging, or other forming operations of ferrous or non-ferrous metal or material. The most common practice in the manufacture of heavy chain of this type, particularly anchor chain and the like, is to forge the link from steel. Forging a piece of metal produces certain flow lines and a particular crystalline structure in the metal which gives the metal greater strength as compared with other forming operations. Bending or distorting the metal in any way after the forging operation weakens the metal by effecting adverse changes in the crystalline structure.

In the forming operation of the present invention, the link 10 is produced in one integral piece with a pair of welding grooves or slots extending entirely through the link at opposite sides of the stud or cross member 11 thereby providing a portion 10a of the link which is carried by the stud 11 and is not otherwise connected to the remaining portion of the link body. After the link has been formed, the portion 10a is displaced upwardly or outwardly from the link 10, as illustrated in Fig. 2, by bending the stud 11. This provides an opening or entrance 12 to the interior of the link 10 having a greater width than the thickness of the link to permit adjacent links 13 to be inserted into the link 10 to form a section of chain as illustrated in Fig. 3.

After insertion of the links 13, the stud 11 and displaced portion 10a of the link 10 are returned to their original position by hammering, forging, or pressing to close the entrance 12 to the interior of the link. The link 10 is then welded as indicated at 14, 14 so that the slots at the opposite sides of the portion 10a are filled with welding material and the portion 10a of the link is secured to the remainder of the link. If desired, the link may be subsequently reforged or smoothed by grinding, pressing, machining, or dressing to return the link to its original shape. By this process the main body portion of the link is not bent or distorted after the link has been formed and the only distortion which takes place is in the stud or cross member 11, which is not a load carrying part of the link and thus the link is not weakened during the insertion of adjacent links.

Figure 4:
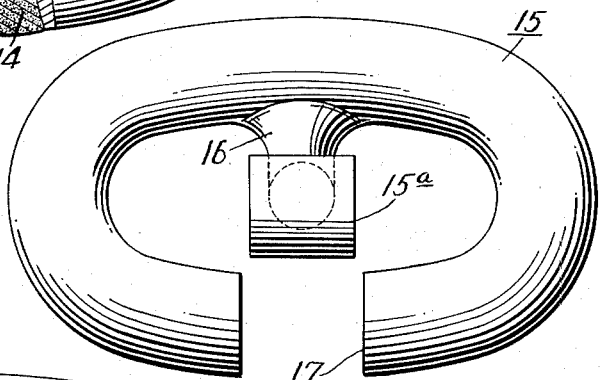
Fig. 4 is a plan view of a modified form of link prepared for the insertion of adjacent links.
Figure 5:
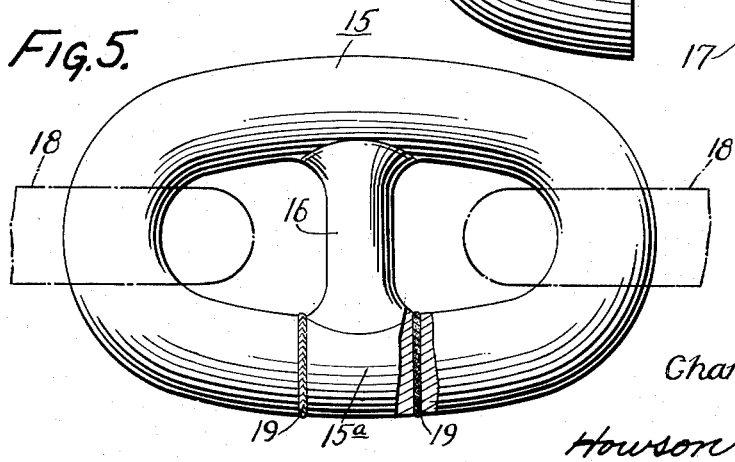
Fig. 5 is a plan view of a portion of a chain using the links illustrated in Fig. 4.

Figs. 4 and 5 of the drawing illustrate a modified form of producing or manufacturing chain according to the present invention. In this embodiment a link 15 is provided which has a stud or cross member 16 thereon extending between opposite side portions of the link. The link is formed as previously described and after the forming opertion is cut at opposite sides of the junction between the stud 16 and one side of the link to provide a portion 15a of the link which is carried by the stud 16. The portion 15a of the link is then displaced outwardly or upwardly from the link by bending the stud 16 to provide an entrance 17 to the interior of the link and permit adjacent links 18, 18 to be inserted into the link, as illustrated in Fig. 5. The stud 16 and link portion 15a are then returned to their original position with the link portion 15a closing the entrance 17 and the link is then welded by oxy-acetylene, induction, flash or butt resistance welding to bind the portion 15a of the link to the remainder of the link. After the welding operation, the link may be reworked or smoothed as previously described to the desired shape to complete the manufacture of a chain.

From the foregoing, it will be observed that the present invention provides a novel method of manufacturing chain wherein each link has exactly the same shape and strength after the chain is assembled as it had prior to the assembling operation and wherein the link itself is not bent or distorted during the insertion of adjacent links.

While particular embodiments of the present invention have been illustrated and described herein, it is not intended to limit the invention to such disclosures and changes and modifications may be incorporated and embodied therein within the scope of the following claims.

I claim:

1. In the method for manufacturing chain, the steps which comprise; forming a link having an opening therein and an integral stud portion extending entirely across said opening, severing one side of the link adjacent opposite sides of the junction of the stud portion with said one side of the link, displacing the severed portion of the link and the adjacent stud portion laterally with respect to the plane of the link to form an entrance through said one side of the link to the link opening, inserting at least one adjacent link into the link opening, and returning the severed portion of the link to the plane of the link in alignment with said one side of the link.

2. In the method for manufacturing chain, the steps which comprise; forming a link having an opening therein and an integral stud portion extending entirely across said opening and simultaneously severing one side of the link adjacent opposite sides of the junction of the stud portion with said one side of the link, displacing the severed portion of the link and the adjacent stud portion laterally with respect to the plane of the link to form an entrance through said one side of the link to the link opening, inserting at least one adjacent link into the link opening, and returning the severed portion of the link to the plane of the link in alignment with said one side of the link.

3. In the method for manufacturing chain, the steps which comprise; forming a link having an opening therein and an integral stud portion extending entirely across said opening, cutting one side of the link adjacent opposite sides of the junction of the stud portion with said one side of the link after the forming operation, displacing the severed portion of the link and the adjacent stud portion laterally with respect to the plane of the link by bending the stud portion to form an entrance through said one side of the link to the link opening, inserting at least one adjacent link into the link opening, and returning the severed portion of the link to the plane of the link in alignment with said one side of the link.

4. In the method for manufacturing chain, the steps which comprise; forming a link having an opening therein and an integral stud portion extending entirely across said opening, severing one side of the link adjacent opposite sides of the junction of the stud portion with said one side of the link, displacing the severed portion of the link and the adjacent stud portion laterally with respect to the plane of the link to form an entrance through said one side of the link to the link opening, inserting at least one adjacent link into the link opening, returning the severed portion of the link to the plane of the link in alignment with said one side of the link, and welding the severed portion of the link to said one side of the link.

5. In the method for manufacturing chain, the steps which comprise; forming a link having an opening therein and an integral stud portion extending entirely across said opening and simultaneously severing one side of the link adjacent opposite sides of the junction of the stud portion with said one side of the link, displacing the severed portion of the link and the adjacent stud portion laterally with respect to the plane of the link to form an entrance through said one side of the link to the link opening, inserting adjacent links into the link opening at opposite sides of the stud, returning the severed portion of the link to the plane of the link in alignment with said one side of the link, and welding the severed portion of the link to said one side of the link.

6. In the method for manufacturing chain, the steps which comprise; forming a link having an opening therein and an integral stud portion extending entirely across said opening, cutting one side of the link adjacent opposite sides of the junction of the stud portion with said one side of the link after the forming operation, displacing the severed portion of the link and the adjacent stud portion laterally with respect to the plane of the link by bending the stud portion to form an entrance through said one side of the link to the link opening, inserting adjacent links into the link opening at opposite sides of the stud, returning the severed portion of the link to the plane of the link in alignment with said one side of the link, welding the severed portion of the link to said one side of the link, and reforming the link at said welded portion.

7. A blank for a joiner chain link comprising a solid side and a split side having legs disposed in spaced axially-aligned relation, a stud formed integrally with the solid side and extending to the split side of the link, and a link body portion on said split side normally disposed in the space between the legs in axial alignment therewith to substantially close the space, integrally connected with said stud and separated from the legs of the split side of the link, said link body portion operable to be displaced from said split side to form an entrance to the interior of the link.

References Cited in the file of this patent

UNITED STATES PATENTS 2,451,254   St. Pierre _____ Oct. 12, 1948